United States Patent
Kamiyama et al.

(10) Patent No.: US 11,253,801 B2
(45) Date of Patent: Feb. 22, 2022

(54) FILTER CLOTH FOR BAG FILTER, METHOD FOR PRODUCING THE SAME, AND BAG FILTER

(71) Applicant: TEIJIN FRONTIER CO., LTD., Osaka (JP)

(72) Inventors: Mie Kamiyama, Osaka (JP); Yoshikazu Kobayashi, Osaka (JP); Kazuyoshi Sakita, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 1047 days.

(21) Appl. No.: 15/542,126

(22) PCT Filed: Nov. 4, 2016

(86) PCT No.: PCT/JP2016/082787
§ 371 (c)(1),
(2) Date: Jul. 7, 2017

(87) PCT Pub. No.: WO2017/086186
PCT Pub. Date: May 26, 2017

(65) Prior Publication Data
US 2018/0257015 A1    Sep. 13, 2018

(30) Foreign Application Priority Data
Nov. 19, 2015    (JP) .............................. JP2015-226549

(51) Int. Cl.
*B01D 39/16* (2006.01)
*B01D 46/02* (2006.01)
*D04H 1/559* (2012.01)

(52) U.S. Cl.
CPC ......... *B01D 39/1623* (2013.01); *B01D 46/02* (2013.01); *D04H 1/559* (2013.01);
(Continued)

(58) Field of Classification Search
None
See application file for complete search history.

(56) References Cited

U.S. PATENT DOCUMENTS

| 8,932,470 B2* | 1/2015 | Fukuda | B01D 39/02 210/645 |
| 2004/0144716 A1* | 7/2004 | Kobayashi | B01D 39/163 210/508 |

(Continued)

FOREIGN PATENT DOCUMENTS

| CN | 102481502 A | 5/2012 |
| CN | 204208376 U | 3/2015 |

(Continued)

OTHER PUBLICATIONS

Kamiyama, Translation of 2015/115418 A1, Espacenet, all pages (Year: 2015).*

(Continued)

*Primary Examiner* — Christopher P Jones
*Assistant Examiner* — Brit E. Anbacht
(74) *Attorney, Agent, or Firm* — Sughrue Mion, PLLC

(57) ABSTRACT

The prevent invention addresses the problem of providing a filter cloth for a bag filter, which has excellent collection efficiency, has excellent collection efficiency, provides low pressure drop and is resistant to clogging, and also has excellent dust-off ability; a method for producing the same; and a bag filter. As a means for resolution, a nonwoven fabric containing an ultrafine fiber having a fiber diameter D of 200 to 2,000 nm is laminated on a base material to form a filter cloth for a bag filter.

20 Claims, 1 Drawing Sheet

(52) U.S. Cl.
CPC ............... *B01D 2239/025* (2013.01); *B01D 2239/0654* (2013.01); *B01D 2239/10* (2013.01); *B01D 2239/1225* (2013.01); *B01D 2239/1233* (2013.01)

(56) References Cited

U.S. PATENT DOCUMENTS

| | | | | |
|---|---|---|---|---|
| 2008/0057283 | A1* | 3/2008 | Blinkhorn | E04B 1/84 |
| | | | | 428/292.1 |
| 2008/0217241 | A1* | 9/2008 | Smithies | B01D 39/163 |
| | | | | 210/505 |
| 2008/0314010 | A1* | 12/2008 | Smithies | D04H 1/559 |
| | | | | 55/498 |
| 2008/0314011 | A1* | 12/2008 | Smithies | B01D 39/1623 |
| | | | | 55/521 |
| 2008/0315464 | A1* | 12/2008 | Smithies | D01D 5/0084 |
| | | | | 264/454 |
| 2008/0315465 | A1* | 12/2008 | Smithies | D04H 13/002 |
| | | | | 264/466 |
| 2009/0255226 | A1 | 10/2009 | Kohli et al. | |
| 2010/0025892 | A1* | 2/2010 | Jones | D04H 3/14 |
| | | | | 264/456 |
| 2011/0147299 | A1* | 6/2011 | Stanfel | B01D 17/045 |
| | | | | 210/491 |
| 2013/0199141 | A1* | 8/2013 | Hamada | D04H 1/4382 |
| | | | | 55/486 |
| 2014/0250848 | A1* | 9/2014 | Winters | B01D 39/2017 |
| | | | | 55/528 |
| 2014/0360145 | A1* | 12/2014 | Hamada | B01D 39/18 |
| | | | | 55/482 |
| 2015/0128545 | A1* | 5/2015 | Seeberger | D04H 3/033 |
| | | | | 55/490 |
| 2015/0182895 | A1* | 7/2015 | Bansal | B01D 46/0001 |
| | | | | 264/544 |
| 2016/0175752 | A1* | 6/2016 | Jaganathan | A41D 13/11 |
| | | | | 95/273 |
| 2016/0228800 | A1* | 8/2016 | Walk | B01D 46/2403 |
| 2016/0303498 | A1* | 10/2016 | Doucoure | B01D 39/2065 |
| 2016/0367922 | A1* | 12/2016 | Kamiyama | B01D 39/163 |
| 2017/0119226 | A1* | 5/2017 | Nakayama | D04H 1/4334 |
| 2017/0266915 | A1* | 9/2017 | Small, Jr. | B32B 5/26 |
| 2017/0341006 | A1* | 11/2017 | Boesner | B01D 39/1623 |
| 2018/0257015 | A1* | 9/2018 | Kamiyama | B01D 46/02 |
| 2018/0290088 | A1* | 10/2018 | Kadavy | B01D 39/163 |
| 2018/0369729 | A1* | 12/2018 | Iyama | D04H 1/4291 |
| 2019/0070540 | A1* | 3/2019 | Sakita | D21H 13/24 |
| 2019/0308390 | A1* | 10/2019 | Bansal | B32B 37/24 |
| 2019/0375187 | A1* | 12/2019 | Oyama | A45D 44/22 |
| 2020/0078717 | A1* | 3/2020 | Inaba | B01D 39/1623 |
| 2020/0164295 | A1* | 5/2020 | Tamura | B32B 5/26 |
| 2020/0299877 | A1* | 9/2020 | You | D04H 3/009 |
| 2020/0370217 | A1* | 11/2020 | Hayashi | D04H 3/007 |

FOREIGN PATENT DOCUMENTS

| | | |
|---|---|---|
| JP | 60-155920 U | 10/1985 |
| JP | 1-292103 A | 11/1989 |
| JP | 1-292180 A | 11/1989 |
| JP | 09-187611 A | 7/1997 |
| JP | 09-313832 A | 12/1997 |
| JP | 2000-140530 A | 5/2000 |
| JP | 2005-281904 A | 10/2005 |
| JP | 2012-92466 A | 5/2012 |
| JP | 2012-237084 A | 12/2012 |
| JP | 2013-121557 A | 6/2013 |
| JP | 5607748 B2 | 10/2014 |
| JP | 2015-140495 A | 8/2015 |
| WO | 2015/115418 A1 | 8/2015 |

OTHER PUBLICATIONS

Japanese Industrial Standards, JIS P8124-2011-01,2011 captured Dec. 27, 2018, all pages https://web.archive.org/web/20181227155628/http://kikakurui.com/p/P8124-2011-01.html (Year: 2018).*

Textile Innovations, "Spunbond polypropylene and spunlace—the difference", all pages https://web.archive.org/web/20211007170924/https://textileinnovations.co.uk/differences-of-spunbond-polypropylene-and-spunlace/ (Year: 2021).*

Decision of Refusal dated Apr. 3, 2018 by the Japan Patent Office in corresponding Japanese Patent Application No. 2017-508706.

Communication dated Nov. 2, 2018 from the State Intellectual Property Office of the P.R.C. in counterpart Application No. 201680009955.0.

International Search Report for PCT/JP2016/082787 dated Jan. 17, 2017.

Communication dated Dec. 12, 2017 from Japanese Patent Office in counterpart application No. 2017-508706.

Communication dated Nov. 28, 2017 from the European Patent Office in counterpart application No. 16866188.2.

Office Action dated Jul. 5, 2021 in Indian Application No. 201717020915.

Office Action dated May 28, 2021 in Chinese Application No. 202010181298.6.

* cited by examiner

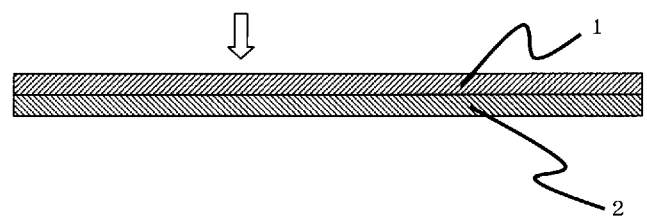

FILTER CLOTH FOR BAG FILTER, METHOD FOR PRODUCING THE SAME, AND BAG FILTER

CROSS REFERENCE TO RELATED APPLICATIONS

This application is a National Stage of International Application No. PCT/JP2016/082787 filed Nov. 4, 2016 (claiming priority based on Japanese Patent Application No. 2015-226549 filed Nov. 19, 2015), the contents of which are incorporated herein by reference in their entirety.

TECHNICAL FIELD

The present invention relates to a filter cloth for a bag filter, which has excellent collection performance, provides low pressure drop and is resistant to clogging, and also has excellent dust-off ability; a method for producing the same; and a bag filter.

BACKGROUND ART

A dust collector includes a planar filter cloth sewn into a cylindrical shape (bag filter). In such a dust collector, a powder to be collected by the filter cloth (dust) is primarily accumulated on the filter cloth surface and thus collected, and then the filter cloth is pulsed to dust off the collected powder.

Such filter cloths are desired to have low pressure drop, high collection efficiency, and excellent dust-off ability without clogging, and various filter cloths have been proposed in the past. For example, a filter cloth configured such that the fiber layer on the surface has a dense structure, a filter cloth configured such that the surface has laminated layers of fine fibers, and the like have been proposed (see, e.g., PTLs 1 to 3).

However, filter cloths for a bag filter, which have excellent collection efficiency, provide low pressure drop and are resistant to clogging, and also have excellent dust-off ability, have been hardly proposed in the past.

CITATION LIST

Patent Literature

PTL 1: JP-A-9-187611
PTL 2: JP-A-9-313832
PTL 3: JP-A-2000-140530

SUMMARY OF INVENTION

Technical Problem

The invention has been accomplished against the above background. An object of the invention is to provide a filter cloth for a bag filter, which has excellent collection efficiency, provides low pressure drop and is resistant to clogging, and also has excellent dust-off ability, a method for producing the same, and a bag filter.

Solution to Problem

The present inventors have conducted extensive research to solve the above problems. As a result, they have found that when a nonwoven fabric containing an ultrafine fiber having a specific fiber diameter is laminated on a base fabric, a filter cloth for a bag filter, which has excellent collection efficiency, provides low pressure drop and is resistant to clogging, and also has excellent dust-off ability, can be obtained. As a result of further extensive research, they have accomplished the invention.

Thus, the invention provides "a filter cloth for a bag filter, including a nonwoven fabric and a base fabric, the filter cloth for a bag filter being characterized in that the nonwoven fabric contains an ultrafine fiber having a fiber diameter D of 200 to 2,000 nm."

At this time, it is preferable that the ratio L/D of fiber length L to fiber diameter D of the ultrafine fiber is within a range of 100 to 2,500. In addition, it is preferable that the ultrafine fiber is a polyester fiber or a polyphenylene sulfide fiber. In addition, it is preferable that the polyester fiber has an elongation of less than 60% or 60% or more. In addition, it is preferable that the nonwoven fabric contains the ultrafine fiber in a proportion of 3 to 50 wt %. In addition, it is preferable that the nonwoven fabric is a spunlace nonwoven fabric. In addition, it is preferable that the nonwoven fabric has a multilayer structure. In addition, it is preferable that the nonwoven fabric has a weight per unit within a range of 10 to 90 g/m$^2$. In addition, it is preferable that the nonwoven fabric has a thickness within a range of 0.2 to 0.6 mm. In addition, it is preferable that the nonwoven fabric has a porosity within a range of 90 to 97%. In addition, it is preferable that the base fabric is a needle-punched nonwoven fabric including a scrim having a weight per unit of 40 to 120 g/m$^2$. It is preferable that the base fabric is a spunbond nonwoven fabric having a weight per unit of 100 to 400 g/m$^2$.

In addition, the invention provides a method for producing the filter cloth for a bag filter described above, including: from a sea-island composite fiber including a sea component and an island component, dissolving away the sea component to give an ultrafine fiber having a fiber diameter D of 200 to 2,000 nm; preparing a nonwoven fabric using the ultrafine fiber; and laminating the nonwoven fabric on a base material.

In addition, the invention provides a bag filter using the filter cloth for a bag filter described above, wherein the spunlace nonwoven fabric is placed on the dust inflow side. At this time, it is preferable that the bag filter is sewn or pleated.

Advantageous Effects of Invention

According to the invention, a filter cloth for a bag filter, which has excellent collection efficiency, provides low pressure drop and is resistant to clogging, and also has excellent dust-off ability, a method for producing the same, and a bag filter are obtained.

BRIEF DESCRIPTION OF DRAWINGS

FIG. 1 schematically shows the placement of a nonwoven fabric on the dust inflow side in the invention. The arrow shows the moving direction of dust.

DESCRIPTION OF EMBODIMENTS

Hereinafter, embodiments of the invention will be described in detail. In the invention, the ultrafine fiber has a fiber diameter D of 200 to 2,000 nm (preferably 200 to 1,000 nm, more preferably 400 to 800 nm). The fiber diameter D is the single-fiber diameter of the ultrafine fiber. When the fiber diameter is more than 2,000 nm, the collection performance may decrease. Conversely, when the fiber diameter is less than 200 nm, the dispersion of the ultrafine fiber may decrease, resulting in a decrease in collection performance.

The fiber diameter can be measured from a cross-sectional photograph of a single fiber at a magnification of 30,000 taken with a transmission electron microscope TEM. At this time, when the TEM has the length measurement function, the fiber diameter can be measured utilizing the length measurement function. In addition, when the TEM does not have the length measurement function, the taken photograph should be enlarged to measure the fiber diameter with a ruler considering the reduction scale.

At this time, in the case where the transverse cross-sectional shape of a single fiber is not a round cross-section but a modified cross-section, as the fiber diameter, the diameter of the circumscribed circle of a transverse cross-section of the single fiber is used.

Although the ultrafine fiber may be long fibers, in terms of enhancing dispersion and obtaining excellent collection performance, short fibers are preferable. At this time, it is preferable that the fiber length (cut length) is within a range of 0.3 to 20 mm. In addition, it is preferable that the ratio L/D of fiber length L to fiber diameter D is within a range of 200 to 4,000 (more preferably 800 to 2,500). When the ratio L/D is less than 200, the entanglement of fibers caused by a high-pressure water jet may decrease. Conversely, when the ratio L/D is more than 4,000, fiber agglomerates may be formed due to poor dispersion, resulting in a decrease in collection performance or strength.

The ultrafine fiber is not particularly limited in kind, but is preferably a polyester fiber or a polyphenylene sulfide (PPS) fiber.

Preferred examples of polyesters for forming a polyester fiber include polyethylene terephthalate (hereinafter sometimes referred to as "PET"), polytrimethylene terephthalate, polybutylene terephthalate, and polyethylene naphthalate. Preferred examples also include hydroxycarboxylic acid condensates containing these polyesters as main repeating units, including aromatic dicarboxylic acids such as isophthalic acid and metal salts of 5-sulfoisophthaiic acid, aliphatic dicarboxylic acids such as adipic acid and sebacic acid, ε-caprolactone, and the like, as well as copolymers with glycol components such as diethylene glycol, trimethylene glycol, tetramethylene glycol, and hexamethylene glycol, etc. It is also possible to use a polyester obtained by material recycling or chemical recycling or polyethylene terephthalate obtained using a monomer component produced from a biomass raw material, that is, a substance of biological origin, as described in JP-A-2009-091694. Further, it is also possible to use a polyester obtained using a catalyst containing a specific phosphorus compound or titanium compound as described in JP-A-2004-270097 or JP-A-2004-211268.

In addition, the polyester fiber may be any of a drawn yarn, an undrawn yarn, or a partially oriented yarn. In addition, the elongation may be less than 60% or may also be 60% or more. Incidentally, a polyester drawn yarn usually has an elongation of less than 60%, and a polyester undrawn yarn usually has an elongation of 60% or more.

As polyarylene sulfide resins for forming a polyphenylene sulfide (PPS) fiber, any of those belonging to a category called "polyarylene sulfide resin" may be used. Examples of polyarylene sulfide resins include resins having, as structural units, for example, a p-phenylene sulfide unit, an m-phenylene sulfide unit, an o-phenylene sulfide unit, a phenylene sulfide sulfone unit, a phenylene sulfide ketone unit, a phenylene sulfide ether unit, a diphenylene sulfide unit, a substituted phenylene sulfide unit, a phenylene sulfide unit having a branched structure, and the like. Among them, those composed of at least 70 mol % p-phenylene sulfide units, particularly at least 90 mol %, are preferable, and poly(p-phenylene sulfide) is still more preferable.

In addition, the polyphenylene sulfide fiber may be any of a drawn yarn, an undrawn yarn, or a partially oriented yarn. In addition, the elongation may be less than 60% or may also be 60% or more. Incidentally, a polyphenylene sulfide drawn yarn usually has an elongation of less than 60%, and a polyphenylene sulfide undrawn yarn usually has an elongation of 60% or more.

The method for producing the ultrafine fiber is not particularly limited, but the method disclosed in WO 2008/130019 is preferable. That is, it is preferable that a composite fiber including an island component formed of a fiber-forming thermoplastic polymer and a sea component formed of a polymer that is more soluble in an aqueous alkaline solution than the fiber-forming thermoplastic polymer (hereinafter sometimes referred to as "easily soluble polymer") is subjected to alkali weight reduction processing to dissolve away the sea component, thereby producing the ultrafine fiber.

Here, when the dissolution rate ratio of the polymer easily soluble in an aqueous alkaline solution forming the sea component to the fiber-forming thermoplastic polymer forming the island component is 200 or more (preferably 300 to 3,000), this results in excellent island separability and thus is preferable.

Preferred examples of easily soluble polymers for forming a sea component include polyesters, aliphatic polyamides, and polyolefins such as polyethylene and polystyrene, which have particularly excellent fiber-forming properties. More specifically, polylactic acid, ultrahigh-molecular-weight polyalkylene oxide condensation polymers, and copolyesters of a polyalkylene glycol compound and 5-sodium sulfoisophthalic acid are highly soluble in an aqueous alkaline solution and thus preferable. Here, an aqueous alkaline solution refers to an aqueous solution of potassium hydroxide, sodium hydroxide, or the like. In addition to them, examples of combinations of a sea component and a solution that dissolves the sea component include: an aliphatic polyamide, such as Nylon 6 or Nylon 66, with formic acid; a polystyrene with trichloroethylene or the like; a polyethylene (particularly high-pressure low-density polyethylene or linear low-density polyethylene) with a hydrocarbon solvent such as heat toluene or xylene; and a polyvinyl alcohol or an ethylene-modified vinyl alcohol polymer with hot water.

Among polyester polymers, a polyethylene terephthalate copolyester having an intrinsic viscosity of 0.4 to 0.6, which is obtained by the copolymerization of 6 to 12 mol % 5-sodium sulfoisophthalic acid and 3 to 10 wt % polyethylene glycol having a molecular weight of 4,000 to 12,000, is preferable. Here, 5-sodium sulfoisophthalic acid contributes to improving the hydrophilicity and melt viscosity, while polyethylene glycol (PEG) improves the hydrophilicity. In addition, with respect to PEG, as the molecular weight increases, a higher hydrophilicity-enhancing effect, which is believed to be attributable to its higher-order structure, is caused, but the reactivity decreases. Also because it is a blend system, problems may occur with heat resistance or spinning stability. In addition, when the copolymerized amount is 10 wt % or more, the melt viscosity may decrease.

Meanwhile, preferred examples of less soluble polymers for forming an island component include polyamides, polyesters, polyolefins, and polyphenylene sulfide (PPS). Specifically, for applications where mechanical strength and heat resistance are required, as polyesters, preferred examples include polyethylene terephthalate (hereinafter sometimes referred to as "PET"), polytrimethylene terephthalate, polybutylene terephthalate, and polyethylene naphthalate. Preferred examples also include hydroxycarboxylic acid condensates containing these polyesters as main repeating units, including aromatic dicarboxylic acids such as isophthalic acid and metal salts of 5-sulfoisophthalic acid, aliphatic dicarboxylic acids such as adipic acid and sebacic acid, ε-caprolactone, and the like, as well as copolymers with glycol components such as diethylene glycol, trimethylene glycol, tetramethylene glycol, and hexamethylene glycol, etc. In addition, as polyamides, preferred examples include aliphatic polyamides such as Nylon 6 and Nylon 66. Meanwhile, polyolefins are hardly affected by acids, alkalis, and the like. As other characteristics, they have relatively low melting points and thus can be used as binder components after removal as ultrafine fibers, for example. Preferred examples thereof include high-density polyethylene, medium-density polyethylene, high-pressure low-density polyethylene, linear low-density polyethylene, isotactic polypropylene, ethylene-propylene copolymers, and copolymers of ethylene and a vinyl monomer such as maleic anhydride. In particular, polyesters, such as polyethylene terephthalate, polytrimethylene terephthalate, polybutylene terephthalate, polyethylene terephthalate-isophthalate having an isophthalic acid copolymerization proportion of 20 mol % or less, and polyethylene naphthalate, and aliphatic polyamides, such as Nylon 6 and Nylon 66, have heat resistance and kinetic properties attributable to their high melting points. Accordingly, these polymers can be used for applications where heat resistance and strength are required as compared with fibrillated ultrafine fibers formed of polyvinyl alcohol/polyacrylonitrile blend-spun fibers, and thus are preferable. Incidentally, the island component is not limited to a round cross-section, and may also have a modified cross-section such as a triangular cross-section or a flat cross-section.

Without affecting their yarn-making properties and the physical properties of the extracted ultrafine fiber, the polymer forming a sea component and the polymer forming an island component may contain various additives, such as organic fillers, antioxidants, heat stabilizers, light stabilizers, flame retardants, lubricants, antistatic agents, rust preventives, crosslinking agents, foaming agents, fluorescent agents, surface lubricants, surface gloss improvers, and mold release improvers such as fluorine resin as necessary.

In the sea-island composite fiber described above, it is preferable that the melt viscosity of the sea component is higher than the melt viscosity of the island component polymer at the time of melt spinning. In such a relation, even when the composite weight proportion of the sea component is as low as less than 40%, islands can be easily prevented from joining together.

It is preferable that the melt viscosity ratio (sea/island) is within a range of 1.1 to 2.0, particularly 1.3 to 1.5. In the case where the ratio is less than 1.1, island components are likely to be joined together at the time of melt spinning, while in the case where it is more than 2.0, the viscosity difference is so large that the spinning conditions may be deteriorated.

Next, it is preferable that the number of islands is 100 or more (more preferably 500 to 2,000). In addition, it is preferable that the sea-island composite weight ratio (sea: island) is within a range of 20:80 to 80:20. Within this range, the sea component thickness between islands can be reduced. As a result, the sea component can be easily dissolved away, making it easy to convert the island component into an ultrafine fiber; therefore, this is preferable. Here, in the case where the proportion of the sea component is more than 80%, the sea component thickness is too large, while in the case where it is less than 20%, the amount of the sea component is so small that islands are likely to be joined together.

The nozzle used for melt spinning may be any of those having hollow pins or micropores (pinless) for forming the island component. For example, it is possible to use a spinneret configured such that an island component extruded from hollow pins or micropores and a sea component flow along a flow path designed to fill between the islands are combined and compressed, thereby forming a sea-island cross-section. The discharged sea-island composite fiber is solidified with cooling air and then taken up on a rotary roller or an ejector set at a predetermined take-up rate, thereby giving an undrawn yarn (preferably having a birefringence Δn of 0.05 or less). The take-up rate is not particularly limited, but is preferably 200 to 5,000 m/min. When the take-up rate is less than 200 m/min, the productivity may decrease. In addition, when it is more than 5,000 m/min, the spinning stability may decrease.

The obtained undrawn yarn may be directly subjected to a cutting step or a subsequent extraction step (alkali weight reduction processing) as necessary, or may also be subjected to a drawing step or a heat treatment step and thus formed into a drawn yarn, and then subjected to a cutting step or a subsequent extraction step (alkali weight reduction processing). At this time, the drawing step may be performed in a separate-drawing fashion, in which spinning and drawing are different steps, or may also be performed in a direct-drawing fashion, in which spinning is immediately followed by drawing in one step. The order of the cutting step and the extraction step may be reversed.

Such cutting is preferably such that, using a guillotine cutter, a rotary cutter, or the like, the undrawn yarn or drawn yarn is directly cut, or 10 to 9,000,000 such yarns are bundled into a tow and cut.

At the time when the sea-island composite fiber is subjected to alkali weight reduction processing and formed into an ultrafine fiber, it is preferable that the ratio between the fiber and the alkaline solution (bath ratio) is 0.1 to 5%, more preferably 0.4 to 3%. When the bath ratio is less than 0.1%, although the contact between the fiber and the alkaline solution is increased, the processability, such as drainage, may be difficult. Meanwhile, when it is more than 5%, the amount of fiber is too large, and thus fibers may get tangled during the alkali weight reduction processing. Incidentally, the bath ratio is defined by the following equation.

Bath ratio (%)=(the mass of fiber(gr)/the mass of aqueous alkaline solution (gr))×100

In addition, it is preferable that the treatment time of the alkali weight reduction processing is 5 to 60 minutes, still more preferably 10 to 30 minutes. When the treatment time is less than 5 minutes, alkali weight reduction may be insufficient. Meanwhile, when it is more than 60 minutes, even the island component may be reduced in weight.

In addition, in the alkali weight reduction processing, it is preferable that the alkali concentration is 2.0 to 10.0%. When the alkali concentration is less than 2.0%, the amount of alkali may be insufficient, resulting in an extremely low weight reduction rate. Meanwhile, when it is more than 10.0%, alkali weight reduction may proceed too much, whereby even the island component is reduced in weight.

As methods for alkali weight reduction, a method in which a sea-island composite fiber is placed in an alkaline solution, subjected to an alkali weight reduction treatment under predetermined conditions for a predetermined period of time, then once subjected to a dehydration step, and placed in water again, where neutralization and dilution are advanced using an organic acid such as acetic acid or oxalic acid, finally followed by dehydration; a method in which a sea-island composite fiber is subjected to an alkali weight reduction treatment for a predetermined period of time and then subjected to a neutralization step first, and water is further injected to advance dilution, followed by dehydration; and the like can be mentioned. In the former method, the treatment is performed batchwise, and thus small-batch production (processing) is possible. However, because the neutralization treatment takes time, the productivity is slightly poor. The latter method allows for semi-continuous production, but is problematic in that a large amount of acidic aqueous solution is required for the neutralization treatment, and also a large amount of water is required for dilution. The treatment equipment is not limited at all. However, in terms of preventing fibers from shedding during dehydration, it is preferable to use a mesh-like object having an aperture ratio (area percentage of the aperture per unit area) of 10 to 50% (e.g., non-alkali-hydrolyzable bag, etc.) as disclosed in Japanese Patent No. 3678511. When the aperture ratio is less than 10%, the passage of moisture is extremely poor, while when it is more than 50%, the shedding of fibers may occur.

Further, it is preferable that after the alkali weight reduction processing, in order to enhance the dispersion of fibers, a dispersant (e.g., Type YM-81 manufactured by Takamatsu Oil & Fat Co., Ltd.) is attached to the fiber surface in a proportion of 0.1 to 5.0 wt % relative to the fiber weight.

In the filter cloth for a bag filter of the invention, the nonwoven fabric may be made only of the ultrafine fiber. However, it is preferable that the ultrafine fiber is contained in a proportion of 3 to 50 wt %, and also a fiber having a larger fiber diameter than the ultrafine fiber is contained in a proportion of 50 to 97 wt %. When the ultrafine fiber content is less than 3 wt %, the collection performance may decrease. Conversely, when the ultrafine fiber content is more than 50 wt %, the pressure drop may increase. In addition, in the case where the nonwoven fabric has a multilayer structure, it is preferable that the ultrafine fiber is contained in a proportion of 3 to 50 wt % relative to the layer weight in each layer.

In the case where the nonwoven fabric is made of the ultrafine fiber and a fiber having a larger fiber diameter than the ultrafine fiber (additional fiber), it is preferable that the additional fiber is a fiber having a single-fiber fineness of 0.05 to 2.2 dtex (more preferably 0.1 to 0.9 dtex). When the single-fiber fineness of the additional fiber is less than 0.05 dtex, the pressure drop may increase. Conversely, when the single-fiber fineness of the additional fiber is more than 2.2 dtex, in the production of a spunlace nonwoven fabric, the entanglement of fibers by a high-pressure water jet may be insufficient, resulting in insufficient strength, or the pore size may become non-uniform causing clogging, resulting in a decrease in the ability to dust off the powder (dust).

In addition, preferred examples of kinds of such additional fibers include a polyester fiber, a polyphenylene sulfide (PPS) fiber, a polyamide fiber, a polyolefin fiber, and rayon.

It is preferable that the nonwoven fabric has a weight per unit within a range of 10 to 90 g/m$^2$ (more preferably 20 to 50 g/m$^2$). When the weight per unit is less than 10 g/m$^2$, pore size variations may be increased, resulting in a decrease in collection performance or dust-off ability. Conversely, when the weight per unit is more than 90 g/m$^2$, the pressure drop may increase.

In addition, it is preferable that the nonwoven fabric has a thickness within a range of 0.2 to 0.6 mm. When the thickness is less than 0.2 mm, the collection performance may decrease. Conversely, when the thickness is more than 0.6 mm, the pressure drop (hereinafter sometimes referred to as "pressure drop") may increase.

In addition, it is preferable that the nonwoven fabric has a porosity within a range of 90 to 97%. When the porosity is less than 90%, the pressure drop may increase. Conversely, when the porosity is more than 97%, it may happen that dust enters the pores and is not detached even by backwashing.

The method for producing the nonwoven fabric is not particularly limited as long as it is a method according to which fibers are entangled together by a high-pressure water jet. In particular, in terms of enhancing the dispersion of the ultrafine fiber, a method in which a wet web is formed using the ultrafine fiber in a papermaking manner, and then fibers are entangled together by a high-pressure water jet, is preferable.

The nonwoven fabric is not particularly limited in kind, but is preferably a spunlace nonwoven fabric. At this time, it is also possible that a plurality of papermaking slurries are prepared and successively added, thereby forming a spunlace nonwoven fabric having a multilayer structure. For example, a papermaking slurry for a first layer and a papermaking slurry for a second layer having a lower ultrafine fiber content than the papermaking slurry for a first layer are prepared and successively added, thereby forming a spunlace nonwoven fabric having a multilayer structure, and the layer having a higher ultrafine fiber content is placed on the dust inflow side. As a result, the collection performance can be improved while suppressing dust entry and also suppressing pressure drop; therefore, this is preferable.

In the filter cloth for a bag filter of the invention, as shown in FIG. 1, the nonwoven fabric is laminated on the base fabric.

At this time, as the base fabric, a needle-punched nonwoven fabric including a scrim is preferable. Because of the presence of a scrim, dimensional changes due to the dust flow or the wind pressure of a backwash pulse can be reduced.

It is preferable that the scrim has a weight per unit within a range of 40 to 120 g/m$^2$. When the weight per unit is less than 40 g/m$^2$, plastic deformation may occur under wind pressure, causing blow leakage. Conversely, when the weight per unit is more than 120 g/m$^2$, it may happen the scrim resists the needle in the needle-punching step, or the scrim itself causes an increase in pressure drop.

As the scrim, for example, a plain woven fabric made of long fibers or short fibers with a single-fiber fineness of 1.0 to 3.0 dtex (preferably a 5- to 20-count two-ply yarn having a fiber length of 20 to 80 mm) is preferable. Preferred examples of kinds of fibers include a polyester fiber, a polyphenylene sulfide (PPS) fiber, and a meta-type or para-type aromatic polyamide fiber.

In addition, preferred examples of fibers for forming the non-scrim part of the needle-punched nonwoven fabric include a polyester fiber, a polyphenylene sulfide fiber, a meta-type wholly aromatic polyamide fiber, and a para-type wholly aromatic polyamide fiber.

In the filter cloth for a bag filter of the invention, a spunbond nonwoven fabric is also preferable as the base fabric. It is preferable that the spunbond nonwoven fabric has a weight per unit within a range of 100 to 400 g/m². When the weight per unit is less than 100 g/m², the rigidity after pleating may be insufficient, resulting in deformation under wind pressure. Conversely, when the weight per unit is more than 400 g/m², the pressure drop may increase. Preferred examples of fibers for forming the spunbond nonwoven fabric include a polyester fiber and a polyphenylene sulfide fiber.

In the filter cloth for a bag filter of the invention, the method for laminating a nonwoven fabric on a base material may be a known method. For example, any of thermal adhesion, chemical adhesion using an adhesive, attachment by sewing, and the like may be used.

The filter cloth for a bag filter of the invention includes the nonwoven fabric described above laminated on a base fabric, and thus has excellent collection performance, provides low pressure drop and is resistant to clogging, and also has excellent dust-off ability.

Next, the bag filter of the invention uses the filter cloth for a bag filter described above, wherein the nonwoven fabric is placed on the dust inflow side. Because of the nonwoven fabric placed on the dust inflow side, the entry of dust is suppressed. Accordingly, the bag filter has excellent collection performance, provides low pressure drop and is resistant to clogging, and also has excellent dust-off ability.

Such a bag filter may be sewn (e.g., sewn into a bag) or pleated, and suitably used as a bag-like bag filter or a cartridge-type bag filter in a dust collector, for example.

EXAMPLES

Next, examples of the invention and comparative examples will be described in detail, but the invention is not limited thereto. Incidentally, measurement items in the Examples were measured by the following methods.

(1) Fiber Diameter D

Using a transmission electron microscope TEM (with the length measurement function), a cross-sectional photograph of a fiber was taken at a magnification of 30,000, and the fiber diameter D (nm) was measured. However, as the fiber diameter D, the diameter of the circumscribed circle of a single-fiber transverse cross-section was used (average of n=5).

(2) Fiber Length L

Using a scanning electron microscope (SEM), short ultrafine fibers (short fiber A) before dissolving away the sea component were laid down on a base, and the fiber length L (mm) was measured at a magnification of 20 to 500 (average of n=5). At this time, the fiber length L was measured utilizing the length measurement function of the SEM.

(3) Weight per Unit

The weight per unit (g/m²) was measured in accordance with JIS P 8124 (Method for Measurement of Basis Weight per Square Meter of Paper).

(4) Thickness

The thickness (mm) was measured in accordance with JIS P 8118 (Method for Measurement of Thickness and Density of Paper and Paper Board). The measurement was performed under a measurement load of 75 g/cm², n=5, and the average was determined.

(5) Porosity

From the above weight per unit and thickness, and also taking the density of a polyethylene terephthalate (PET) fiber as 1.36 g/cm³, the porosity was calculated using the following equation.

Porosity (%)=100−(((weight per unit)/(thickness)/1.36)×100)

(6) PF Value

From the pressure drop and collection efficiency, the high performance index of a filter was calculated using the following equation.

PF value=−log(0.3μtransmission (%)/100)/(pressure drop (Pa)/9.8)×100

(7) Dust Holding Capacity: DHC

JIS Class-8 Dust was introduced into a filter at a concentration of 1 g/m² and an entry rate of 10 cm/sec. The time for the pressure drop to reach 2 kPa and the weight of dust held by the filter at that time were measured, and converted into a dust holding capacity per m².

(8) Melt Viscosity

A polymer after a drying treatment is mounted on an orifice set at the extruder temperature for spinning, maintained in a molten state for 5 minutes, and then extruded under several levels of loads applied. The resulting shear rate and melt viscosity are plotted. A shear rate-melt viscosity curve was formed based on the obtained data, and the melt viscosity at a shear rate of 1,000 sec-1 was read.

(9) Alkali Weight Reduction Rate Ratio

A sea component polymer and an island component polymer were each discharged from a nozzle having 24 round holes of 0.3 mm in diameter and 0.6 mm in length and taken up at a spinning rate of 1,000 to 2,000 m/min. The obtained undrawn yarn was drawn to give a residual elongation within a range of 30 to 60%, thereby forming a multifilament of 83 dtex/24 fil. Using a 1.5 wt % aqueous NAOH solution at 80° C., at a bath ratio of 100, the weight reduction rate of the multifilament was calculated from the dissolution time and the dissolution amount.

(10) Air Permeability

In accordance with JIS L 1096-1990, specimens 15 cm in warp×15 cm in weft were taken at three points per meter width of a sample. The amount of air (cc/cm²·sec) passing through each specimen was measured by a fragile method, and the average was calculated.

(11) Bag Filter Performance Test

The filtration performance was measured in accordance with JIS Z 8901-1. From the results of measurement under the following measurement conditions, the resistance to clogging and dust-off ability were judged.

<Measurement Conditions>
Filtration rate: 2.0 m/min
Size of cut filter cloth: 500 mm×500 mm
Effective filtration area (suction side): 0.09 m² (300 mm×300 mm)
Powder dust concentration: 5.0 g/m³
Dust-off air pressure: 500 kPa
Dust-off time: 50 ms
Dust-Off Conditions
  Initial performance: dusted off when ΔP=1,000 Pa is reached. (30 times)
  Aging: dusted off at intervals of 5 seconds. (5,000 times)
  Stabilization treatment: dusted off when ΔP=1,000 Pa is reached. (10 times)
  Performance after stabilization: dusted off when ΔP=1,000 Pa is reached. (30 times)
Used Powder:
  JIS Class-10 Fly Ash, average particle size: 3.77 μm,
  Particle size of 10 μm or less: 96.6%

Performance measurement: pressure drop (Pa) and exhaust concentration (mg/m³)

EXAMPLE 1

Polyethylene terephthalate having a melt viscosity of 120 Pa·sec at 285° C. was used as an island component, and modified polyethylene terephthalate obtained by the copolymerization of 4 wt % polyethylene glycol having a melt viscosity of 135 Pa·sec at 285° C. and an average molecular weight of 4,000 and 9 mol % 5-sodium sulfoisophthalic acid was used as a sea component. The polymers were spun at a sea:island weight ratio of 10:90 using a nozzle having 400 islands, and then taken up at a spinning rate of 1,500 m/min. The difference in alkali weight reduction rate was 1,000-fold. The obtained yarn was drawn to 3.9 times the original length and then cut to 1,000 µm using a guillotine cutter, thereby giving a sea-island composite fiber for an ultrafine fiber A. The fiber was then subjected to 10% weight reduction in a 4% aqueous NaOH solution at 75° C., and the resulting fiber was defined as an ultrafine fiber A (fiber diameter: 700 nm, fiber length: 1 mm, aspect ratio: 1,400, round cross-section).

Next, a spunlace nonwoven fabric having a total weight per unit of 30 g/m², which includes: a first layer having a weight per unit of 10 g/m² and composed of 20 wt % the ultrafine fiber A and 80 wt % polyethylene terephthalate short fibers with a single-fiber fineness of 0.1 dtex and a fiber length of 5 mm; and a second layer having a weight per unit of 20 g/m² and composed of 50 wt % polyethylene terephthalate short fibers with a single-fiber fineness of 0.1 dtex and a fiber length of 5 mm and 50 wt % rayon with a single-fiber fineness of 0.8 dtex and a fiber length of 7 mm, was obtained.

At this time, papermaking slurries including the components of the first layer and the second layer, respectively, were separately prepared and introduced into the head box of a papermaking machine. The slurry feed and the white water feed were adjusted to make a predetermined weight per unit, and a laminated wet web was formed, followed by an entanglement treatment using a high-pressure jet at a water pressure of 100 kPa.

Subsequently, in order to improve the porosity, an air-through heat treatment was performed at a hot air temperature of 145 to 155° C.

Meanwhile, short fibers of a polyester fiber having a single-fiber fineness of 2.2 dtex, a fiber length of 51 mm, and 11.5 crimps/2.54 cm were passed through a card, and thus formed into a web and cross-lapped. Next, two rolls of such laminated webs were prepared, and a scrim having a weight per unit of 80 g/m² was sandwiched between them, thereby giving a needle-punched nonwoven fabric having a weight per unit of 520 g/m². Here, the scrim is a plain woven fabric that is made of a 10-count two-ply yarn of polyester short fibers (single-fiber fineness: 2.2 dtex, fiber length: 51 mm) and has a weaving density of 12 yarns/2.54 cm (both weft and yarn).

The obtained spunlace nonwoven fabric and needle-punched nonwoven fabric were adhesive-laminated using an adhesive resin by a spin-spray method, and further subjected to a calendaring heat treatment at 150° C. to smoothen the surface. Evaluation results are shown in Table 1.

EXAMPLE 2

The same procedure as in Example 1 was performed, except that a monolayer spunlace nonwoven fabric having a weight per unit of 30 g/m² and composed of 20 wt % the ultrafine fiber A with a fiber diameter of 700 nm and a fiber length of 1 nm (aspect ratio: 1,400) and 80 wt % polyethylene terephthalate short fibers with a single-fiber fineness of 0.1 dtex and a fiber length of 5 mm was obtained. Evaluation results are shown in Table 1.

EXAMPLE 3

Polyethylene terephthalate having a melt viscosity of 120 Pa·sec at 285° C. was used as an island component, and modified polyethylene terephthalate obtained by the copolymerization of 4 wt % polyethylene glycol having a melt viscosity of 135 Pa·sec at 285° C. and an average molecular weight of 4,000 and 9 mol % 5-sodium sulfoisophthalic acid was used as a sea component. The polymers were spun at a sea:island weight ratio of 10:90 using a nozzle having 400 islands, and then taken up at a spinning rate of 1,500 m/min. The difference in alkali weight reduction rate was 1,000-fold. The obtained yarn was cut to 1,000 µm using a guillotine cutter without drawing, thereby giving a sea-island composite fiber for an ultrafine fiber B. The fiber was then subjected to 10% weight reduction in a 4% aqueous NaOH solution at 75° C., and the resulting fiber was defined as an ultrafine fiber B (fiber diameter: 1.2 µm, fiber length: 1 mm, aspect ratio: 850, round cross-section).

Next, a spunlace nonwoven fabric having a total weight per unit of 30 g/m², which includes: a first layer having a weight per unit of 10 g/m² and composed of 30 wt % the ultrafine fiber B and 70 wt % polyethylene terephthalate short fibers with a single-fiber fineness of 0.1 dtex and a fiber length of 5 mm; and a second layer having a weight per unit of 20 g/m² and composed of 50 wt % polyethylene terephthalate short fibers with a single-fiber fineness of 0.1 dtex and a fiber length of 5 mm and 50 wt % polyethylene terephthalate short fibers with a single-fiber fineness of 1.2 dtex and a fiber length of 5 mm, was obtained. Example 3 was performed in otherwise the same manner as in Example 1. Evaluation results are shown in Table 1.

EXAMPLE 4

The same procedure as in Example 1 was performed, except that a spunlace nonwoven fabric having a total weight per unit of 30 g/m², which includes: a first layer having a weight per unit of 10 g/m² and composed of 15 wt % the same ultrafine fiber A as in Example 1, 15 wt % the same ultrafine fiber B as in Example 3, and 70 wt % polyethylene terephthalate short fibers with a single-fiber fineness of 0.1 dtex and a fiber length of 5 mm; and a second layer having a weight per unit of 20 g/m² and composed of 50 wt % polyethylene terephthalate short fibers with a single-fiber fineness of 0.1 dtex and a fiber length of 5 mm and 50 wt % rayon with a single-fiber fineness of 0.8 dtex and a fiber length of 7 mm, was obtained. Evaluation results are shown in Table 1.

EXAMPLE 5

The same procedure as in Example 1 was performed, except that a spunlace nonwoven fabric having a total weight per unit of 30 g/m², which includes: a first layer having a weight per unit of 10 g/m² and composed of 30 wt % the same ultrafine fiber A as in Example 1 and 70 wt % polyethylene terephthalate short fibers with a single-fiber fineness of 0.1 dtex and a fiber length of 5 mm; and a second layer having a weight per unit of 20 g/m² and composed of 10 wt % the same ultrafine fiber A as in Example 1, 40 wt % polyethylene terephthalate short fibers with a single-fiber fineness of 0.1 dtex and a fiber length of 5 mm, and 50 wt % rayon with a single-fiber fineness of 0.8 dtex and a fiber length of 7 mm, was obtained. Evaluation results are shown in Table 1.

EXAMPLE 6

The same procedure as in Example 1 was performed, except that the spunlace nonwoven fabric was adhesive-laminated to a spunbond nonwoven fabric (weight per unit: 250 g/m$^2$) made of a polyester fiber having a single-fiber fineness of 1.7 dtex as a base material, and further subjected to a calendering treatment at 150° C. with a clearance of 2 mm to smoothen the surface. Evaluation results are shown in Table 1.

COMPARATIVE EXAMPLE 1

The same procedure as in Example 1 was performed, except that a layer having a weight per unit of 10 g/m$^2$ and composed of 100 wt % polyethylene terephthalate short fibers with a single-fiber fineness of 0.1 dtex and a fiber length of 5 mm was used as the first layer. Evaluation results are shown in Table 1. From the DHC measurement results, it can be seen that it takes a long period of time to reach 2,000 Pa, and dust actually penetrates the inside of the spunlace nonwoven fabric and the needle-punched nonwoven fabric.

EXAMPLE 7

The same procedure as in Example 1 was performed, except that a layer having a weight per unit of 10 g/m$^2$ and composed of 60 wt % the ultrafine fiber A and 40 wt % polyethylene terephthalate short fibers with a single-fiber fineness of 0.1 dtex and a fiber length of 5 mm was used as the first layer. Evaluation results are shown in Table 1. The initial pressure drop increased.

COMPARATIVE EXAMPLE 2

The same procedure as in Example 1 was performed, except that the spunlace nonwoven fabric was not used. Evaluation results are shown in Table 1. The initial pressure drop was low, but a large amount of dust penetrated the nonwoven fabric, and the dust-off ability was low. As a result, during long-term operation, the pressure drop increased and the life decreased.

COMPARATIVE EXAMPLE 3

The same procedure as in Example 1 was performed, except that a PTFE film was used in place of the spunlace nonwoven fabric. Evaluation results are shown in Table 1. Although the collection efficiency was high, the pressure drop was high, and the cloth was inferior in terms of energy saving.

EXAMPLE 8

Using the sample of Example 1, the filtration performance was measured in accordance with JIS Z 8901-1. The initial blow leakage was low, an increase in pressure drop was small, and also the amount of residual dust after the stabilization treatment was small. Accordingly, a dust cake layer was formed in the early stage of operation, and such a layer was easy to detach and reproduce with a backwash pulse. The cloth was thus excellent in terms of energy saving and had a long life.

COMPARATIVE EXAMPLES 4 AND 5

Using the sample of Comparative Example 2 in Comparative Example 4 and the sample of Comparative Example 3 in Comparative Example 5, the filtration performance was measured in accordance with JIS Z 8901-1.

EXAMPLE 9

Polyphenylene sulfide having a melt viscosity of 130 Pa·sec at 295° C. was used as an island component, and modified polyethylene terephthalate obtained by the copolymerization of 4 wt % polyethylene glycol having a melt viscosity of 145 Pa·sec at 295° C. and an average molecular weight of 4,000 and 9 mol % 5-sodium sulfoisophthalic acid was used as a sea component. The polymers were spun at a sea:island weight ratio of 30:70 using a nozzle having 400 islands, and then taken up at a spinning rate of 1,500 m/min. The difference in alkali weight reduction rate was 1000-fold or more. The obtained yarn was drawn to 3.5 times the original length and then cut to 1,000 μm using a guillotine cutter, thereby giving a sea-island composite fiber for an ultrafine fiber C. The fiber was then subjected to 10% weight reduction in a 4% aqueous NaOH solution at 75° C., and the resulting fiber was defined as an ultrafine fiber C (fiber diameter: 700 nm, fiber length: 1 mm, aspect ratio: 1,400, round cross-section).

Next, a spunlace nonwoven fabric having a total weight per unit of 30 g/m$^2$, which includes: a first layer having a weight per unit of 10 g/m$^2$ and composed of 30 wt % the ultrafine fiber C and 70 wt % polyphenylene sulfide short fibers with a single-fiber fineness of 0.9 dtex and a fiber length of 5 mm; and a second layer having a weight per unit of 20 g/m$^2$ and composed of 50 wt % polyphenylene sulfide short fibers with a single-fiber fineness of 0.9 dtex and a fiber length of 5 mm and 50 wt % rayon with a single-fiber fineness of 0.8 dtex and a fiber length of 7 mm, was obtained. At this time, papermaking slurries including the components of the first layer and the second layer, respectively, were separately prepared and introduced into the head box of a papermaking machine. The slurry feed and the white water feed were adjusted to make a predetermined weight per unit, and a laminated wet web was formed, followed by an entanglement treatment using a high-pressure jet at a water pressure of 100 kPa. Subsequently, in order to improve the porosity, an air-through heat treatment was performed at a hot air temperature of 145 to 155° C.

Meanwhile, short fibers of a polyester fiber having a single-fiber fineness of 2.2 dtex, a fiber length of 51 mm, and 11.5 crimps/2.54 cm were passed through a card, and thus formed into a web and cross-lapped. Next, two rolls of such laminated webs were prepared, and a scrim having a weight per unit of 80 g/m$^2$ was sandwiched between them, thereby giving a needle-punched nonwoven fabric having a weight per unit of 520 g/m$^2$. The scrim is a plain woven fabric that is made of a 10-count two-ply yarn of polyester short fibers (single-fiber fineness: 2.2 dtex, fiber length: 51 mm) and has a weaving density of 12 yarns/2.54 cm (both weft and yarn).

The obtained spunlace nonwoven fabric and needle-punched nonwoven fabric were adhesive-laminated by spin-spraying an adhesive resin, and further subjected to a calendaring heat treatment at 180° C. to smoothen the surface. Evaluation results are shown in Table 2.

EXAMPLE 10

Polyphenylene sulfide having a melt viscosity of 130 Pa·sec at 295° C. was used as an island component, and modified polyethylene terephthalate obtained by the copolymerization of 4 wt % polyethylene glycol having a melt viscosity of 145 Pa·sec at 295° C. and an average molecular weight of 4,000 and 9 mol % 5-sodium sulfoisophthalic acid was used as a sea component. The polymers were spun at a sea:island weight ratio of 30:70 using a nozzle having 800 islands, and then taken up at a spinning rate of 1,500 m/min. The difference in alkali weight reduction rate was 1000-fold or more. The obtained yarn was drawn to 3.1 times the original length and then cut to 1,000 μm using a guillotine cutter, thereby giving a sea-island composite fiber for an ultrafine fiber D. The fiber was then subjected to 10% weight reduction in a 4% aqueous NaOH solution at 75° C., and the resulting fiber was defined as an ultrafine fiber D (fiber diameter: 400 nm, fiber length: 1 mm, aspect ratio: 1,400, round cross-section).

A monolayer spunlace nonwoven fabric having a weight per unit of 30 g/m$^2$ and composed of 40 wt % the ultrafine fiber D with a fiber diameter of 400 nm and a fiber length of 1 mm (aspect ratio: 1,400) and 60 wt % polyphenylene sulfide short fibers with a single-fiber fineness of 0.9 dtex and a fiber length of 5 mm was obtained. Example 10 was performed in otherwise the same manner as in Example 9. Evaluation results are shown in Table 2.

EXAMPLES 11 AND 12

Using the sample of Example 9 in Example 11 and the sample of Example 10 in Example 12, the filtration performance was measured in accordance with JIS Z 8901-1.

TABLE 1

| Composition | Item | Unit | Example 1 | Example 2 | Example 3 | Example 4 | Example 5 | Example 6 | Comparative Example 1 | Example 7 | Comparative Example 2 | Comparative Example 3 |
|---|---|---|---|---|---|---|---|---|---|---|---|---|
| First Layer | Spunlace Fiber diameter: 700 nm × 1 mm (Ultrafine fiber A) | wt % | 20 | 20 | — | 15 | 30 | 20 | — | 60 | — | PTFE film |
| | 0.1 dtex × 5 mm | wt % | 80 | 80 | 70 | 70 | 70 | 80 | 100 | 40 | — | |
| | Fiber diameter: 1.2 μm × 1 mm (Binder Ultrafine fiber B) | wt % | — | — | 30 | 15 | — | — | — | — | — | |
| | Weight per unit | g/m² | 10 | 30 | 10 | 10 | 10 | 10 | 10 | 10 | — | 10 |
| Second Layer | Fiber diameter: 700 nm × 1 mm | wt % | 50 | — | 50 | 50 | 10 | 50 | 50 | 50 | — | |
| | 0.1 dtex × 5 mm | wt % | 50 | — | 0 | 50 | 40 | 50 | 50 | 50 | — | |
| | Rayon, 0.8 dtex × 7 mm | wt % | — | — | 50 | — | 50 | — | — | — | — | |
| | 1.2 dtex × 5 mm | wt % | — | — | — | — | — | — | — | — | — | |
| | Weight per unit | g/m² | 20 | 20 | 20 | 20 | 20 | 20 | 20 | 20 | — | |
| Nano Layer | Spunlace layer porosity | % | 97 | 96 | 93 | 92 | 90 | 97 | 98 | 85 | — | |
| Base Material | 2.2 dtex × 51 mm Scrim | g/m² | 440 | 440 | 440 | 440 | 440 | — | 440 | 440 | 440 | 440 |
| | Spunbond, average single-fiber fineness: 1.7 dtex | g/m² | 80 | 80 | 80 | 80 | 80 | 250 | 80 | 80 | 80 | 80 |
| Physical Properties | Total weight per unit | g/m² | 550 | 550 | 550 | 550 | 550 | 280 | 550 | 550 | 550 | 530 |
| | Thickness | mm | 2.08 | 2.03 | 1.87 | 1.95 | 1.76 | 1.43 | 2.05 | 1.98 | 2.05 | 1.95 |
| | Air permeability | cc/cm²·sec | 13.05 | 11.5 | 9.9 | 10.7 | 8.7 | 7.5 | 15.8 | 4.8 | 19.9 | 2.85 |
| | Atmospheric dust collection efficiency 0.3 μm | % | 30.5 | 34.9 | 45.2 | 43.8 | 75.5 | 39.5 | 20.6 | 90.2 | 24.2 | 99.8 |
| | 0.5 μm | % | 39.5 | 42.3 | 48.5 | 46.2 | 79.3 | 43.8 | 33.6 | 93 | 29.7 | 99.7 |
| | 1.0 μm | % | 56.8 | 60.4 | 59.9 | 57.6 | 84.9 | 55.1 | 39 | 94.7 | 43 | 99.9 |
| | 2.0 μm | % | 76.4 | 83.8 | 89.5 | 86.5 | 90.5 | 67.4 | 58.1 | 95.8 | 58.4 | 100 |
| | 5.0 μm | % | 100 | 100 | 100 | 100 | 100 | 100 | 89.6 | 100 | 100 | 100 |
| | Pressure drop | Pa | 44 | 49 | 65 | 54 | 75 | 65 | 33 | 178 | 31 | 223 |
| | PF value @ 0.3 μm collection efficiency | — | 3.5 | 3.7 | 3.9 | 4.5 | 8.0 | 3.3 | 3.0 | 5.6 | 3.8 | 11.9 |
| | DHC | g/m² | 4.3 | 3.8 | 3.3 | 4 | 2.9 | 3.2 | 9.6 | Higher than 2000 Pa | 17.3 | — |
| | Time | min | 36.8 | 32.1 | 29.7 | 33.9 | 26.7 | 30.3 | 85.7 | — | 144.7 | — |

| | | | Example 8 | Comparative Example 4 | Comparative Example 5 |
|---|---|---|---|---|---|
| JIS Z8909-1 | <Initial Performance> | | | | |
| | Initial pressure drop | Pa | 32 | 22 | 220 |
| | Residual pressure drop after 30 cycles | Pa | 92 | 42 | 260 |
| | Blow leakage concentration | mg/m³ | 0.36 | 1.52 | 0.1 |
| | <Performance after Stabilization> | | | | |
| | Pressure drop after stabilization | Pa | 128 | 113 | 350 |
| | Residual pressure drop after stabilization | Pa | 138 | 128 | 420 |

TABLE 1-continued

| | | | | | | | | |
|---|---|---|---|---|---|---|---|---|
| Residual dust amount per m² | g/m² | 70.8 | — | — | — | — | — | 138.6 | 46.2 |
| Blow leakage concentration | mg/m³ | 0.01 | — | — | — | — | — | 0.02 | 0.01 |

TABLE 2

| No. | Item | Unit | Example 9 | Example 10 |
|---|---|---|---|---|
| Composition First Layer | Spunlace | | | |
| | Fiber diameter: 700 nm × 1 mm (Ultrafine fiber C) | wt % | 30 | — |
| | Fiber diameter: 400 nm × 1 mm (Ultrafine fiber D) | wt % | — | 40 |
| | 0.9 dtex × 5 mm (PPS) | wt % | 70 | 60 |
| | Weight per unit | g/m² | 10 | 30 |
| Second Layer | | wt % | — | — |
| | 0.9 dtex × 5 mm (PPS) | wt % | 50 | — |
| | Rayon, 0.8 dtex × 7 mm | wt % | 50 | — |
| | | wt % | — | — |
| | Weight per unit | g/m² | 20 | — |
| Nano Layer | Spunlace layer porosity | % | 97 | 90 |
| Base Material | 2.2 dtex × 51 mm (PPS) | g/m² | 440 | 440 |
| | Scrim (PPS) | g/m² | 80 | 80 |
| | Spunbond, average single-fiber fineness: 1.7 dtex | g/m² | — | — |
| Physical Properties | Total weight per unit | g/m² | 550 | 550 |
| | Thickness | mm | 2.08 | 1.99 |
| | Air permeability | cc/cm² · sec | 12.3 | 6.8 |
| | Atmospheric dust collection efficiency | 0.3 μm | 29.6 | 54.7 |
| | | 0.5 μm | 40.3 | 60.2 |
| | | 1.0 μm | 55.1 | 70.5 |
| | | 2.0 μm | 71.9 | 89.3 |
| | | 5.0 μm | 100 | 100 |
| | Pressure drop | Pa | 38 | 60 |
| | PF value @ 0.3 μm collection efficiency | — | 3.9 | 5.6 |
| | DHC | g/m² | 5.5 | 4.1 |
| | Time | min | 40.2 | 32.1 |

| No. | | | Example 11 | Example 12 |
|---|---|---|---|---|
| JIS Z8909-1 | <Initial Performance> | | | |
| | Initial pressure drop | Pa | 28 | 40 |
| | Residual pressure drop after 30 cycles | Pa | 69 | 85 |
| | Blow leakage concentration | mg/m³ | 0.53 | 0.19 |
| | <Performance after Stabilization> | | | |
| | Pressure drop after stabilization | Pa | 124 | 110 |
| | Residual pressure drop after stabilization | Pa | 138 | 121 |
| | Residual dust amount per m² | g/m² | 82.1 | 67.9 |
| | Blow leakage concentration | mg/m³ | 0.01 | 0.01 |

INDUSTRIAL APPLICABILITY

According to the invention, a filter cloth for a bag filter, which has excellent collection efficiency, provides low pressure drop and is resistant to clogging, and also has excellent dust-off ability, a method for producing the same, and a bag filter are provided. The industrial value thereof is extremely high.

REFERENCE SIGNS LIST

1: Nonwoven fabric
2: Base fabric

The invention claimed is:

1. A filter cloth for a bag filter, comprising:
a nonwoven fabric and a base fabric,
the filter cloth for a bag filter being characterized in that the nonwoven fabric contains an ultrafine fiber having a fiber diameter D of 200 to 2,000 nm and the nonwoven fabric has a porosity within a range of 92 to 97%,
wherein the ultrafine fiber has a fiber length of 1.0 to 20 mm and the nonwoven fabric is a spunlace nonwoven fabric.

2. The filter cloth for a bag filter according to claim 1, wherein the ratio L/D of fiber length L to fiber diameter D of the ultrafine fiber is within a range of 200 to 4,000.

3. The filter cloth for a bag filter according to claim 1, wherein the ultrafine fiber is a polyester fiber or a polyphenylene sulfide fiber.

4. The filter cloth for a bag filter according to claim 3, wherein the polyester fiber has an elongation of less than 60%.

5. The filter cloth for a bag filter according to claim 1, wherein the nonwoven fabric contains the ultrafine fiber in a proportion of 3 to 50 wt %.

6. The filter cloth for a bag filter according to claim 1, wherein the nonwoven fabric has a multilayer structure.

7. The filter cloth for a bag filter according to claim 1, wherein the nonwoven fabric has a weight per unit within a range of 10 to 90 g/m².

8. The filter cloth for a bag filter according to claim 1, wherein the nonwoven fabric has a thickness within a range of 0.2 to 0.6 mm.

9. The filter cloth for a bag filter according to claim 1, wherein the base fabric is a needle-punched nonwoven fabric including a scrim having a weight per unit of 40 to 120 g/m².

10. The filter cloth for a bag filter according to claim 1, wherein the base fabric is a spunbond nonwoven fabric having a weight per unit of 100 to 400 g/m².

11. A method for producing the filter cloth for a bag filter according to claim 1, comprising:
from a sea-island composite fiber including a sea component and an island component, dissolving away the sea component to give an ultrafine fiber having a fiber diameter D of 200 to 2,000 nm;
preparing a nonwoven fabric using the ultrafine fiber; and
laminating the nonwoven fabric on a base material.

12. A bag filter using the filter cloth for a bag filter according to claim 1, wherein the nonwoven fabric is placed on a dust inflow side.

13. The bag filter according to claim 12, being sewn or pleated.

14. The filter cloth for a bag filter according to claim 3, wherein the polyester fiber has an elongation of 60% or more.

15. The filter cloth for a bag filter according to claim 2, wherein the ultrafine fiber is a polyester fiber or a polyphenylene sulfide fiber.

16. The filter cloth for a bag filter according to claim 15, wherein the polyester fiber has an elongation of less than 60%.

17. The filter cloth for a bag filter according to claim 15, wherein the polyester fiber has an elongation of 60% or more.

18. The filter cloth for a bag filter according to claim 3, wherein the ultrafine fiber is a polyphenylene sulfide fiber.

19. The filter cloth for a bag filter according to claim 18, wherein the polyphenylene sulfide fiber comprises at least 70 mol % p-phenylene sulfide units.

20. The filter cloth for a bag filter according to claim 1, wherein the ultrafine fiber has a fiber length of 5 to 20 mm.

\* \* \* \* \*